Figure 4:
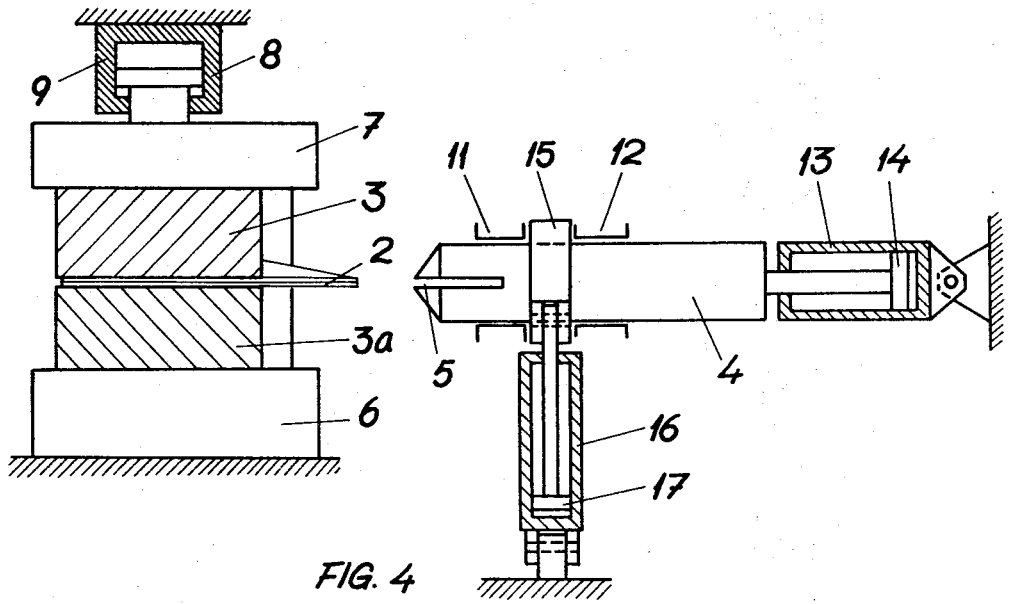

United States Patent

[11] 3,580,039

[72] Inventor Martti Heinonen
  Turku, Finland
[21] Appl. No. 738,547
[22] Filed June 20, 1968
[45] Patented May 25, 1971
[73] Assignee Valmet Oy
  Helsinki, Finland
[32] Priority June 21, 1967
[33] Finland
[31] 1753/67

[54] DEVICE FOR MANUFACTURING BLADES FOR THE BLADE WHEEL OF AN AXIAL FLOW MACHINE
5 Claims, 6 Drawing Figs.
[52] U.S. Cl. .................................................. 72/316, 72/322, 72/371, 29/23.5, 29/156.8
[51] Int. Cl. .................................................. B21d 41/02
[50] Field of Search ........................................ 72/299, 316, 404, 371; 29/156.8, 156 (B), 156 (CF), 156 (FC), 156 (H), 156 (P), 156 (T), 23.5

[56] References Cited
UNITED STATES PATENTS
| | | | |
|---|---|---|---|
| 3,012,308 | 12/1961 | Zech et al. .................... | 29/156.8 |
| 2,843,919 | 7/1958 | Garaventa et al. ............. | 29/156.8 |
| 2,389,876 | 11/1945 | Sequin .......................... | 29/156.8 |
| 2,611,414 | 9/1952 | Sampatacos ................... | 72/299 |

Primary Examiner—Charles W. Lanham
Assistant Examiner—Michael J. Keenan
Attorney—Richards and Geier ABSTRACT: Blades which are to be attached to the blade wheel of an axial flow machine, have a paddle part and an attachment surface which are simultaneously shaped in two molds. One of these molds shapes the paddle part in the desired manner while the other mold imparts the final shape to the attachment surface. Then the two molds with the blade still clamped in them are twisted to produce the desired blade angle.

Patented May 25, 1971
3,580,039
2 Sheets-Sheet 1
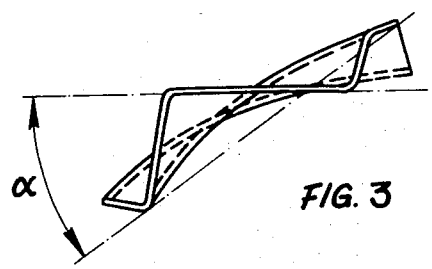
FIG. 3
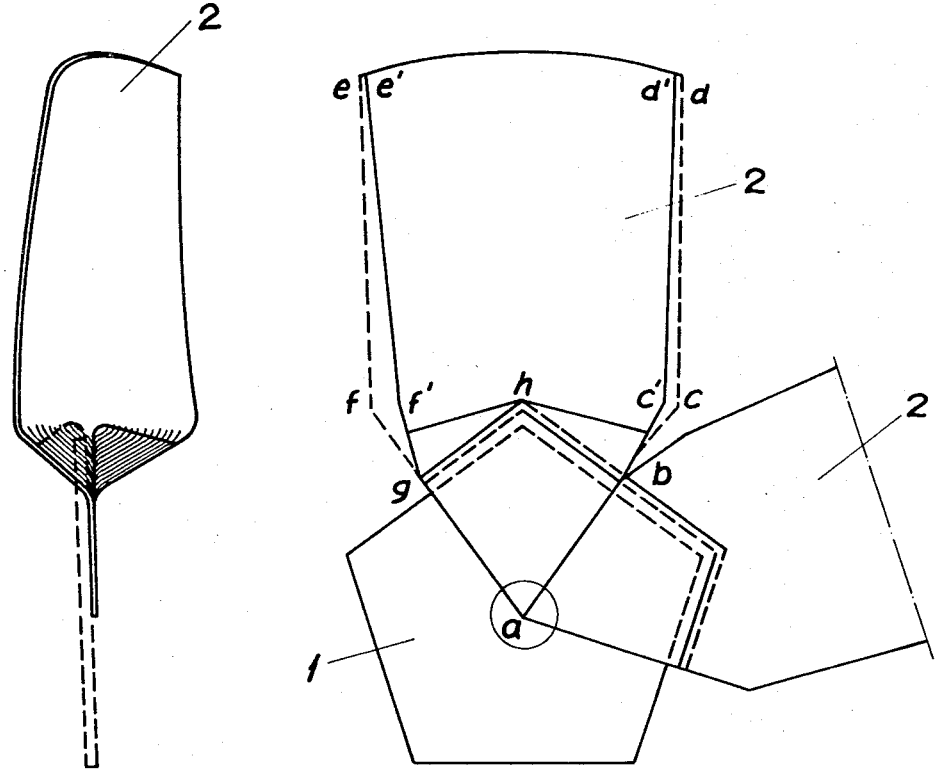
FIG. 2
FIG. 1
MARTTI HEINONEN
INVENTOR
By:
ATTORNEYS Patented May 25, 1971

3,580,039

2 Sheets-Sheet 2

MARTTI HEINONEN
INVENTOR

By: Richards & Geir

ATTORNEYS

DEVICE FOR MANUFACTURING BLADES FOR THE BLADE WHEEL OF AN AXIAL FLOW MACHINE

The present invention concerns a method and a device for manufacturing blades, to be made of sheet material, for blade wheels of axial flow machines, in particular of air blowers.

Prior art includes the manufacturing of such blade wheels either in one piece of sheet material or from a separate hub part and from blades attached to it e.g. by riveting or by welding.

In order that a shape consistent with good flow characteristics might be given to such blade wheels made of sheet material, tools and jigs of rather complicated shape are required. For instance when a set of blade wheels comprising various sizes has to be made, individual tools and jigs have to be made for each size. This tends to confine the application of the method because the making of expensive tools and jigs implies large manufacturing series.

The aim of the present invention is to eliminate these drawbacks. The intention is to manufacture the blades of a blade wheel assembled from parts with the aid of very simple tools and fixtures, which may in part also be used for different sizes of a flow machine series, e.g. of a blower series. It is further intended that with the aid of these simple tools and fixtures blades of blade wheels might be manufactured which have different blade angles, an accomplishment which has not been possible by any previously known methods.

In the present invention the problem outlined above has been solved in very simple manner. A method according to the invention is mainly characterized in that the paddle part of the blade and its attachment surface are both shaped in separate molds and that they are twisted while clamped in their molds in such manner with reference to each other that a blade angle of desired magnitude is obtained.

A device according to the present invention, again, is mainly characterized in that the parts of the device shaping the paddle part of the blade and its attachment surface, respectively, are turnable with reference to each other so that it is possible with the aid of the device to manufacture blades having different blade angles.

By using the method and the device, the manufacturing of numerous and complex tools and jigs is avoided. For instance, if the paddle surface of an axial blower has cylindrical shape, the tool which is used for shaping the paddle is inexpensive and simple because the shape-producing surfaces of the tool, most suitably a mold consisting of two parts, are cylindrical surfaces, which may be produced e.g. on the lathe. Again, if the hub piece has the character of a plane, the attachment surfaces of the blade can be shaped as planes. In both instances the same tools, that is the same molds, can be used for all blade sizes of a given blower series. It is to be understood, of course, that the paddle surface of the blade, and consequently also the mold surface producing its shape, can be given any other plane or curved shape other than cylindrical. When blade wheels are manufactured for varying purposes, it is possible in a device according to the invention to change merely the molds shaping the paddle part and/or the attachment surface to suit the purpose in question. Since furthermore the parts of the device shaping the paddle part of the blade and the attachment surface, respectively, are turnable with reference to each other while both parts of the blade, to wit, the paddle part and the attachment part, are simultaneously clamped in them, the blade can be imparted any desired blade angle as may be required. If, moreover, the elements imparting rotatory motion to the device are so arranged that twisting can be effected in either direction, one and the same device may be used in manufacturing blades to fit both left-handed and right-handed blade wheels.

Figure 5:
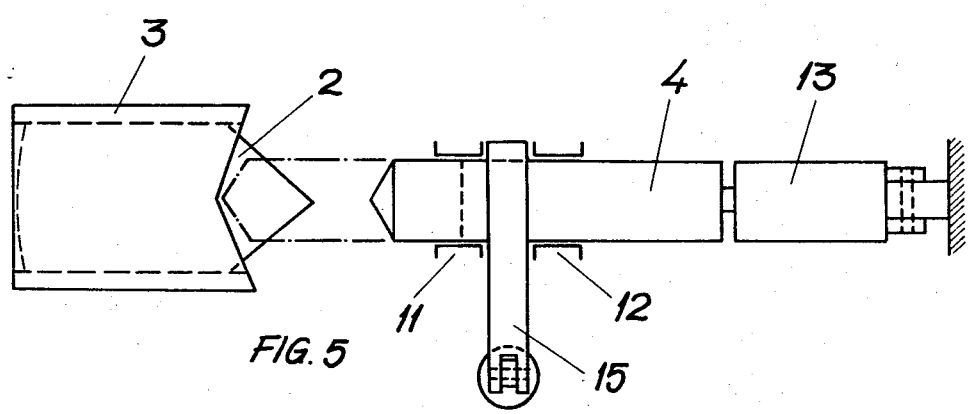
Figure 6:
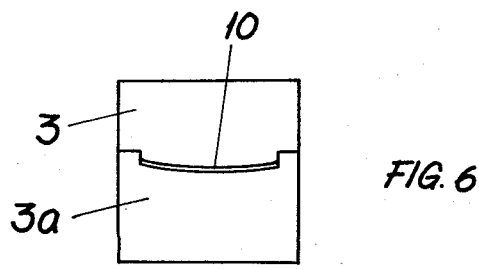

The invention is described in closer detail with reference to the attached drawing, in which:

FIG. 1 displays part of the blade wheel of an axial blower, seen from the direction of entering air, FIG. 2 shows a blade as in FIG. 1, seen from one side, FIG. 3 shows a section of a blade as in FIG. 1, viewed from the direction of the hub, FIG. 4 shows a device for manufacturing a blade as in FIG. 1, viewed from the side and partly in section, FIG. 5 shows a device as in FIG. 4, in top view, and FIG. 6 shows the mold, constituting a part of a device as in FIG. 4, which shapes the paddle part of the blade, viewed from the end of the device.

In FIG. 1, the reference numeral 1 indicates the hub piece of the blade wheel, to which the blades 2 have been attached by spot welding, welding or riveting, only two such blades having been depicted in the figure. The partly dotted outline $abcdefg$ in FIG. 1 represents the shape of the blade blank before its shaping with the aid of a device according to the invention. The solid outline $abc'd'e'f'g'$ represents a blade shaped by a method according to the invention, after completed shaping. The part $c'd'e'f'h$ of the blade is understood to be the paddle part of the blade, to which in the mold a shape consistent with favorable flow characteristics, e.g. the shape of a cylinder surface, has been imparted. The part $abhg$ of the blade, again, is understood to be the attachment surface of the blade, which in this instance is a plane and which will be attached to the hub piece 1. The parts $bc'h$ and $gf'h$ of the blade are understood to be parts of the sheet which remain between the paddle part and attachment surface of the shaped blade, which have approximately triangular shape and which on rotation of the molds with reference to each other are twisted, with reference to the plane of the attachment surface, by an angle consistent with the blade angle $\alpha$. In FIG. 3 the projection of the blade as seen from the direction of the hub has been shown and the blade angle $\alpha$ has been indicated, which is thus understood to be the angle between the cord drawn to the profile of the root portion of the paddle and the attachment plane.

The device presented in FIGS. 4 and 5 comprises for the shaping of blades a mold 3,3a consisting of two parts, which shapes the region $c'd'e'f'h$ (FIG. 1) of the blade paddle. In FIG. 4 the mold 3,3a and the blade 2 have been shown in section. In FIG. 6 the mold 3,3a has been shown as seen from the end of the device, and the figure discloses between the mold halves 3 and 3a a gap 10, in which the proper shape is imparted to the said paddle part. In the embodiment illustrated by FIG. 4 the lower mold 3a has been mounted on a lower stand 6 and the upper mold 3 has been fixed to a vertically movable table 7. This table is moved e.g. by a hydraulic press 8, the reference numeral 9 indicating the piston of this press.

Furthermore, the device comprises a twisting jaw 4, which has a slit 5 at its end pointing towards the workpiece. The twisting jaw is axially displaceable with the aid of the push press 13, the reference numeral 14 indicating the piston of this press. The axial movement of the twisting jaw 4 is guided by the bearings 11 and 12. The position of the twisting jaw 4 indicated with dotted lines in FIG. 5 represents its working position proper. The twisting jaw is moreover turnable about its axis by means of an arm 15 attached to it and of a press 16 moving this arm. The reference numeral 17 indicates the piston of the press 16.

The operation of the device is very simple. The paddle part $cdef$ of the blade blank out from sheet material is placed upon the mold half 3a and the blank is pressed by means of the upper mold 3 to assume the shape of the gap 10. The twisting jaw 4 is pushed with the aid of the press 13 to impact the attachment surface $abhg$ of the blade blank. The twisting jaw is turned or rotated with the aid of the arm 15 and the press 16 about its longitudinal axis to the extent that the desired blade angle is achieved. The travel of the piston 17 is adjustable, and different blade angles suited to each individual application can thus be imparted to the shaped blade surface. The twisting jaw 4 may be provided with elements by means of which the direction in which it is turned can be reversed, whereby the device may be used to manufacture blades for right-hand as well as left-hand blade wheels.

It is thus noted that with the aid of very simple tools, that is molds, of the kind which has been described above blades of sheet material for blade wheels of many different shapes and different sizes may be manufactured, and which blades may with the same device be made to have the blade angle $\alpha$ consistent with each particular type of blade wheel.

The invention is not confined to the example presented, but it may be varied within the scope of the patent claims. For instance, the gap 10 in the pressure mold 3,3a may equally have the shape of some other surface with favorable flow characteristics. The shape of the twisting jaw 4 may also vary; it may for instance equally be a mold consisting of two parts, but which obviously has to be turnable with reference to the mold 3,3a. The elements causing the molds and the twisting jaw to move may equally be of some other design known in prior art than that presented in the example. It is obvious that the device may be made automatically operating, by means of arrangements in themselves known in prior art.

I claim:

1. A method of manufacturing blades for the blade wheel of an axial flow machine, each of said blades having a paddle part and a hub attachment part, said method comprising simultaneously separately clamping and shaping in final form the paddle part and the attachment part and then twisting the parts relatively to each other while continuing to clamp them to provide a desired blade angle.

2. A device for manufacturing blades for the blade wheel of an axial flow machine, each of said blades having a paddle part and a hub attachment part, said device comprising a mold for clamping and shaping in final form the paddle part, a separate mold for simultaneously clamping and shaping in final form the attachment part, and means twisting at least one of said molds relatively to the other mold while the molds clamp said parts to impart to the blade a desired blade angle.

3. Device as in claim 2, characterized that one or both parts of the device shaping the paddle and the attachment surface is/are a pressure mold consisting of two parts.

4. Device as in claim 2, characterized in that one or both parts of the device shaping the parts of the blade is/are a mold in principle consisting of one piece and having a slit which when pushed upon the blade blank shapes it as desired.

5. Device as in claim 2, characterized in that the mutual position and direction of rotation of the molds shaping the parts of the blade are reversible so that with one and the same device blades appropriate for both right-hand and left-hand blade wheels may be manufactured.